United States Patent [19]

Washall

[11] 4,224,301
[45] Sep. 23, 1980

[54] REMOVAL OF TELLURIUM FROM GLYCOL ESTER SOLUTIONS

[75] Inventor: Thomas A. Washall, Wilmington, Del.

[73] Assignee: Atlantic Richfield Company, Los Angeles, Calif.

[21] Appl. No.: 67,658

[22] Filed: Aug. 20, 1979

[51] Int. Cl.$^2$ ............................................. C01B 19/00
[52] U.S. Cl. ................................. 423/508; 423/509; 560/246
[58] Field of Search ..................... 423/508–510; 560/246

[56] References Cited

U.S. PATENT DOCUMENTS

| | | | |
|---|---|---|---|
| 3,479,395 | 11/1969 | Huguet | 560/246 |
| 3,637,515 | 1/1972 | Huguet | 252/439 X |
| 3,668,239 | 6/1972 | Kollar | 560/246 |
| 3,689,535 | 9/1972 | Kollar | 560/246 |
| 3,715,388 | 2/1973 | Valbert | 560/246 |
| 3,715,389 | 2/1973 | Hoch et al. | 560/246 |
| 3,743,672 | 7/1973 | Kollar | 560/246 |
| 3,789,065 | 1/1974 | Kollar | 560/246 |
| 3,907,874 | 9/1975 | Harvey et al. | 560/246 |
| 3,985,795 | 10/1976 | Kollar | 560/246 |
| 4,045,477 | 8/1977 | Sherwin et al. | 560/246 |
| 4,073,876 | 2/1978 | Coupta | 423/508 |

*Primary Examiner*—Earl C. Thomas
*Attorney, Agent, or Firm*—Delbert E. McCaslin

[57] ABSTRACT

A method for the removal and recovery of tellurium from a vicinal glycol ester solution containing soluble tellurium compounds by contacting the tellurium-containing glycol ester solution at a suitable temperature with granular activated carbon to adsorb the soluble tellurium compounds. The tellurium may be recovered from the activated carbon and converted to a form suitable for reuse in the preparation of the vicinal glycol esters.

9 Claims, No Drawings ent. 4,224,301

REMOVAL OF TELLURIUM FROM GLYCOL ESTER SOLUTIONS

BACKGROUND OF THE INVENTION

In U.S. Pat. Nos. 3,479,395, 3,637,515, 3,668,239, 3,689,535, 3,715,388, 3,715,389, 3,743,672, 3,789,065, 3,907,874, 3,985,795, 4,045,477 and 4,073,876 there is disclosed processes for the preparation of vicinal glycol esters by the liquid phase oxidation of an olefin, such as ethylene or propylene in a carboxylic acid medium, such as acetic acid using a tellurium catalyst and a source of halide ions.

The present invention is directed to an effective method of recovering the tellurium from vicinal glycol ester solutions produced, for example, by such above described processes and containing tellurium in the form of soluble inorganic tellurium compounds and organotellurium compounds. Because of the high reactivity of tellurium, in combination with a halide source when used as a catalyst as in the above reaction its combination with organic compounds such as the carboxylic acids and olefins employed very frequently results in the formation of organo-tellurium compounds, such as tetra and divalent alkyl tellurium halides, tellurium carboxylate compounds and the compounds described for example in an article by Jan Bergman, Kemisk Tedskrift, Vol. 88 (11) pp. 62-3, 1976, Sweden, entitled New Production Process for Ethylene Glycol as well as other soluble tellurium compounds which remain in solution with the glycol ester reaction product. In such reaction, a portion of the tellurium catalyst such as tellurium dioxide, etc. is itself or in combination with the halide source, converted to one or more organotellurium compounds. The type and number of organotellurium compounds which may be formed is a function of the reaction conditions to produce the vicinal glycol ester such as time, temperature, carboxylic acid and any solvent which might be employed. In addition, at least some of the inorganic tellurium compounds used as catalysts or formed in the reaction, such as tellurium tetrabromide, may also remain in solution with the glycol ester product.

Because of the cost and toxicity of tellurium, it is essential that as much of the tellurium be recovered from the glycol ester reaction product as is possible and from the inorganic or organotellurium compounds in a form suitable for reuse as a catalyst.

There is no known prior art which describes the removal and recovery of soluble inorganic or organotellurium compounds from a vicinal glycol ester product by adsorption on granular activated carbon and prepared by the tellurium catalyzed acetoxylation of olefins.

SUMMARY OF THE INVENTION

This invention relates to a process for the removal and recovery of tellurium from organic solutions containing soluble inorganic or organic tellurium compounds. More specifically, the present invention concerns a process for the granular activated carbon adsorption of tellurium compounds from glycol ester solutions obtained from the tellurium catalyzed liquid phase reaction of an olefin, molecular oxygen and an aliphatic monocarboxylic acid in the presence of a halide ion as described for example in any of the aforementioned United States patents the processes of which are incorporated herein by reference. The crude vicinal glycol ester products produced by such processes, which may contain one or more soluble organotellurium compounds as well as soluble inorganic tellurium compounds, are percolated through, or intimately contacted with, granular activated carbon to adsorb the soluble tellurium compounds leaving a tellurium-free vicinal glycol ester reaction product which may be processed to recover the ester product and by products and any undesirable or unrecoverable material burned, if desired for fuel value without loss of valuable tellurium. The tellurium may be recovered from the activated carbon by washing with for example, acetic acid followed by purging with a mineral acid such as hydrochloric, nitric, etc. and/or with steam. The tellurium enriched wash solution may be subjected to stripping or distillation to remove water and recover acid leaving a tellurium compound concentrate or residue which may be treated to recover the tellurium in a form suitable for reuse in the vicinal glycol ester synthesis reaction.

Advantages provided by the process of the present invention, are (1) it is an adsorption process and therefore not dependent upon differences in the relative volatilities of the tellurium and non-tellurium containing components of the glycol ester tellurium-containing solutions as would be associated with possible distillation recovery methods and (2) there is no dependence upon relative solubilities of the tellurium and non-tellurium containing components as related to possible liquid-liquid extraction methods of recovery.

It is an object of this invention therefore to provide a process for the substantial recovery of valuable tellurium from tellurium-containing vicinal glycol ester solutions and the ultimate purification of the glycol ester.

It is another object of this invention to provide a process for the recovery of tellurium in a form suitable for recycle and reuse as a catalyst for the synthesis of vicinal glycol esters by the liquid phase oxidation of an olefin in an aliphatic carboxylic acid medium.

It is a further object of this invention to recover contained tellurium values from tellurium-containing vicinal glycol ester solutions utilizing an activated carbon to absorb the soluble tellurium compounds from the solutions and to recover the tellurium from the activated carbon for conversion to a form suitable for recycle and resue in the vicinal glycol esters synthesis process.

These and other objects and advantages of this invention will become apparent from the description of the invention which follows and from the claims.

DETAILED DESCRIPTION OF THE INVENTION

In accordance with the present invention, a vicinal glycol ester solution containing soluble tellurium compounds, as for example, an ethylene glycol ester solution obtained by reacting under liquid phase oxidative conditions, ethylene, molecular oxygen and an aliphatic monocarboxylic acid such as acetic acid at a temperature of from about 80° C. to 200° C. in the presence of an effective amount of a tellurium catalyst such as tellurium dioxide in combination with a source of halide ions such as hydrobromic acid, is contacted with granular activated carbon by percolation of the tellurium-containing glycol ester solution through a bed of the carbon or is intimately slurried with the carbon to adsorb the contained soluble tellurium compounds leaving an essentially tellurium free vicinal glycol ester reaction product which may then be processed by conventional methods to recover the desired vicinal glycol ester product and by-products. The activated carbon containing the tellurium compound adsorbate is then subjected to an acid wash followed by purging with steam and/or a mineral acid to desorb the tellurium compounds from the activated carbon and form tellurium-containing wash solution. The tellurium-containing wash solution is then stripped or distilled to remove water and the acids leaving a tellurium compound concentrate or residue. The tellurium compound concentrate or residue containing various tellurium compounds may be treated to recover the tellurium in catalytically useful form. One method is to convert the tellurium, in the presence of air or oxygen, to tellurium dioxide at temperatures of from about 600° C. to 1000° C. preferably 700° C. to 950° C. and recover the $TeO_2$ from the effluent reactor stream by cooling to collect the $TeO_2$.

Tellurium per se, which may be present in the crude vicinal glycol ester reaction product is insoluble and may be and is preferably recovered, along with any other insoluble tellurium compounds, by filtration prior to treatment of the reaction product with activated carbon to remove the soluble tellurium compounds.

The amount and type of tellurium compounds in the crude vicinal glycol ester reaction product will generally depend on the type and amount of tellurium compound and halide ion source employed to produce the glycol ester as well as the reaction conditions and ester being produced. Thus the amount of soluble tellurium in the form of inorganic tellurium compounds and/or organotellurium compounds can range from about 0.25 percent to 1.5 percent or more by weight of the glycol ester produced, for example, by the processes as set forth in U.S. Pat. Nos. 3,668,239 and 3,715,389 noted above.

The carboxylic acids employed to prepare the vicinal glycol esters are generally used as solvent as well as to supply the moiety for the subsequent ester produced and are preferably the lower aliphatic monocarboxylic acids containing 1 to 4 carbon atoms, especially acetic acid, although other inert solvents such as water, tetrahydrofuran, dioxane, etc. may be employed in the process in addition to the monocarboxylic acid reactant. The separation and recovery of the soluble tellurium compounds by employing activated carbon according to the present invention, is not dependent upon the concentration of the carboxylic acid reactant-solvent, the major component, in addition to the ester and glycol products produced. The reaction product or effluent reaction product stream should be fluid enough to pass through or be able to be filtered from the activated carbon employed. Generally, the concentration of the carboxylic acid should be in the range of between 10 and 90 weight percent and preferably in the 20 to 40 weight percent range.

The activated carbon which may be employed in the process of the invention is an amorphous form of carbon which generally has a surface area ranging from about 300 to 2000 $m^2/g$. and is usually a dense, hard and regenerable granular activated carbon intended for packed bed adsorption application. The pore structure of such carbons are generally controlled to provide a broad range of pore sizes with the larger pore sizes being predominant. Such activated carbons may be prepared from a variety of materials of animal, vegetable or mineral origin such as bone char, wood, hard and soft coal, lignite, coconut shells, coke and petroleum residues. The preparation of activated carbon including some liquid phase and vapor phase applications appears in the Kirk and Othmer, Encyclopedia of Chemical Technology, 2nd Edition, Volume 4, pp. 149–157. Typical of the activated carbons commercially available which may be employed in the process of the present invention are for example, (1) "Nuchar WV-G" prepared from bituminous coal and sold by Westvaco, Chemical Division and having an iodine number (minimum of 1050, a particle size (U.S. Sieve Series) of approximately 12×40, an apparent density of 27.5 lb./ft.$^3$ and a surface area (nitrogen BET method) of 1100 $m^2/g$. and (2) Type "SGL", "CAL" and "OL" granular carbons prepared from bituminous coal and sold by the Calgon Corporation having iodine numbers (minimum) of 900, 1000, and 1000, particle size of approximately 8×30 mesh, 12×40 mesh and 20×50 mesh, apparent densities of 30, 27.5 and 28.1 lb./ft.$^3$, and a surface area ($N_2$, BET method) of 950–1050, 1000–1100, and 1000–1100 $m^2/g$. respectively.

The tellurium adsorption process of this invention may generally be carried out at temperatures of from about ambient to temperatures of about 95° C. and preferably between about 15° C. and 30° C. Higher or lower temperatures may be employed but are limited by the volatility of the lowest boiling components in the reaction solution to be treated and the freezing point of the reaction solution or the temperature at which the viscosity increase inhibits proper flow through or intimate mixture with the activated carbon respectively.

After the crude tellurium compound containing vicinal glycol ester solution has been treated with the activated carbon to essentially remove the soluble tellurium compounds and separated therefrom it may be processed by any known method to recover the ester product. The activated carbon with the tellurium compounds adsorbed thereon is then treated to recover the tellurium. A preferred method is to acid wash the carbon with a carboxylic acid similar to the ester moiety of the crude vicinal glycol ester processed to remove any entrained ester product and then purge the carbon with steam and/or a mineral acid to desorb the tellurium from the carbon. The wash-purge solution containing the recovered tellurium compounds is then stripped or distilled to remove contained water and acid leaving a tellurium compound concentrate or residue. The tellurium compound concentrate containing various tellurium compounds is then combusted as hereinabove described to recover the tellurium in catalytically useful form.

Although the process of the present invention will be directed to the treatment for the removal and recovery of tellurium compounds from a crude vicinal glycol ester solution which is an ethylene glycol diacetate solution containing tellurium compounds as well as other by-products and produced by the liquid phase oxidation of ethylene and acetic acid with molecular oxygen in the presence of tellurium dioxide and hydrobromic acid as set forth in U.S. Pat. No. 3,715,389, it is not intended that the process be limited to such ethylene glycol diacetate solution and those skilled in the art will recognize that the present process is broadly applicable to the treatment of other vicinal glycol ester solutions such as ethylene glycol diformate, dipropionate, dibutyrate, diisobutyrate, etc. as well as the propylene glycol diesters, 2,3-butanediol diesters, etc. which have been prepared, for example, by the tellurium catalyzed processes as described in the above noted U.S. patents.

The following Examples are provided to illustrate the recovery of tellurium compounds from a glycol ester solution in accordance with the principles of this invention but are not construed as limiting the invention in any way except as indicated by the claims.

In the Examples which follow the ethylene glycol diacetate solution was obtained by taking the effluent from a tellurium oxide catalyzed conversion of ethylene with acetic acid, hydrobromic acid, 2-bromoethyl acetate and oxygen as described in U.S. Pat. No. 3,715,389. The crude ethylene glycol diacetate solution after filtration to remove insoluble components contained approximately 24.74 percent acetic acid, 0.86 percent hydrobromic acid, 1.25 percent bromoacetic acid, 0.36 percent soluble tellurium as tellurium compounds, 5.0 percent water, 61.79 percent acetate and formate esters of ethylene glycol and diethylene glycol and 6.0 percent of unidentified high molecular weight by-product material.

EXAMPLE 1

20 grams of the crude ethylene glycol ester solution containing 0.36 percent total soluble tellurium was percolated through a 0.5 inch diameter glass column containing a 6 inch bed of 12×40 mesh activated carbon ("Nuchar WV-G", of Westvaco Chemical Division—a bituminous coal derived activated carbon described hereinabove), followed by an acetic acid wash to remove entrained product. X-ray analysis of two 10 gram samples of activated carbon treated effluent showed that the total soluble tellurium of the crude solution was reduced from 0.36 percent to 0.02 percent and 0.05 percent in the first and second 10 gram fractions respectively. The average percent tellurium value of the effluent represented a 93 percent tellurium removal.

EXAMPLE 2

237.6 grams of the crude ethylene glycol ester solution containing 0.36 percent (0.855 grams total soluble tellurium was percolated through a 0.75 inch diameter glass column containing 20 grams of 12×40 mesh activated carbon ("Nuchar WV-G" sold by Westvaco, Chemical Division). Table 1 below shows that 97 percent of the solution was recovered with a tellurium content of 156 ppm as compared to 3600 ppm in the crude solution. A total of 0.807 grams of tellurium was retained on the activated carbon showing a capacity of approximately 1 g. tellurium/25 grams of activated carbon. After percolation the carbon was washed with acetic acid to remove entrained product.

TABLE 1

| Fraction No. | Weight (gms.) | Tellurium % | Tellurium (gms.) |
|---|---|---|---|
| 1-16 | 166.09 | 0.010 | — |
| 17 | 10.51 | 0.03 | .00315 |
| 18 | 10.63 | 0.04 | .00425 |
| 19 | 11.22 | 0.05 | .00561 |
| 20 | 10.10 | 0.14 | .01414 |
| 21 | 22.06 | 0.04 | .00882 |
|  | 230.61 total |  | .03597 total[1] |
| Acetic Acid Wash | 57.49 | 0.02 | .01150 |
| Total gms. Te Charged | 0.85536 |  |  |
| Total gms. Te in Effluent | 0.04747 |  |  |
| Total gms. Te Retained | 0.80789 gms./20 gms. carbon |  |  |

[1]equals 0.0156 percent Te in effluent.

EXAMPLE 3

The procedure of Example 1 was repeated using a 6 inch bed of 20×50 mesh activated carbon (Type "OL" granular carbon of the Calgon Corporation, Activated Carbon Division, a bituminous coal derived from activated carbon described hereinabove). X-ray analysis of two 10 gram samples of the activated carbon treated effluent showed that the total soluble tellurium of the crude solution was reduced from 0.36 percent to 0.012 percent and 0.018 percent in the first and second 10 gram fractions respectively. The average percent tellurium value of the effluent represents a 95 percent tellurium removal.

EXAMPLE 4

The 20 gram of activated carbon employed in Example 2 and containing the tellurium compound adsorbate and retained in the glass column was washed with 50 grams of acetic acid followed by a 40 gram nitric acid (95 percent) wash and a steam purge at 100° C. to desorb the tellurium compounds from the carbon and reactivate the carbon and form a tellurium-containing wash solution. The tellurium-containing wash solution was distilled at a temperature of from 80° C. to 120° C. to remove contained water and acid leaving a tellurium compound concentrate which was further treated by heating to a temperature of 850° C. in the presence of air to convert the tellurium contained in the concentrate to tellurium dioxide which was recovered by cooling the effluent air-TeO$_2$ stream to collect the TeO$_2$.

I claim:

1. A process for the removal and recovery of tellurium from tellurium-containing vicinal glycol ester solutions derived from the tellurium catalyzed liquid phase reaction of an olefin, molecular oxygen and an aliphatic monocarboxylic acid in the presence of a halide ion which comprises the steps of:

contacting the tellurium-containing vicinal glycol ester solution at a suitable temperature with granular activated carbon to adsorb soluble tellurium compounds from said tellurium-containing ester solution;

subjecting the activated carbon containing a tellurium compound adsorbate to an acid wash followed by a steam purge to desorb the tellurium compounds from the carbon and form a tellurium containing wash solution;

stripping or distilling the wash solution to remove contained water and acid leaving a tellurium compound concentrate; and recovering tellurium from said tellurium concentrate.

2. A process according to claim 1 wherein the vicinal glycol solution is an ethylene glycol ester solution.

3. A process according to claim 2 wherein the solution is an ethylene glycol diacetate solution.

4. A process according to claim 1 wherein the activated carbon has a surface area of between about 300 and 2000 m$^2$/gm.

5. A process according to claim 1 wherein the adsorption is carried out at temperatures of from about ambient to about 95° C.

6. A process according to claim 5 wherein the temperature is in the range of from about 15° C. to 30° C.

7. A process according to claim 1 wherein the tellurium compound concentrate is treated with air or oxygen at a temperature of from about 600° C. to 1000° C.

to convert the contained tellurium to tellurium dioxide and recovering said tellurium dioxide.

8. A process according to claim 7 wherein the treatment is carried out at a temperature of from about 700° C. to 950° C.

9. A process for the removal and recovery of tellurium from a tellurium-containing ethylene glycol diacetate solution derived from the tellurium catalyzed liquid phase reaction of ethylene, molecular oxygen and acetic acid in the presence of a bromide ion at a temperature of from about 80° C. to 200° C. which comprises the steps of:

contacting the tellurium-containing ethylene glycol diacetate solution at a temperature of from about 15° C. to 30° C. with a granular activated carbon to adsorb soluble tellurium compounds from said tellurium-containing ethylene glycol diacetate solution;

subjecting the activated carbon containing a tellurium compound adsorbate to a nitric acid wash followed by a steam purge at 100° C. to desorb the tellurium compounds from the activated carbon and form a tellurium-containing wash solution;

distilling the wash solution at a temperature of from about 80° C. to 120° C. to remove contained water and acid leaving a tellurium compound concentrate;

treating the tellurium compound concentrate with air at a temperature of from about 700° C. to 950° C. to convert the contained tellurium to tellurium dioxide; and recovering said tellurium dioxide by cooling the $TeO_2$-air effluent.

* * * * *